United States Patent [19]
Cortes

[11] Patent Number: 5,906,383
[45] Date of Patent: May 25, 1999

[54] HOME SHOPPING CART

[76] Inventor: Ricardo Cortes, 2604 W. Catanba Dr., Harvey, La. 70058

[21] Appl. No.: 08/850,395

[22] Filed: May 2, 1997

[51] Int. Cl.[6] ........................................ B62B 3/02
[52] U.S. Cl. ............. 280/47.371; 280/659; 280/DIG. 4
[58] Field of Search ............................... 280/651, 655.1, 280/659, 47.371, 33.991, 33.992, 33.994, 30, DIG. 3, DIG. 4

[56] References Cited

U.S. PATENT DOCUMENTS

| | | | |
|---|---|---|---|
| 2,935,330 | 5/1960 | Millman | 280/33.992 |
| 3,112,934 | 12/1963 | Buczak | 280/47.371 |
| 4,109,926 | 8/1978 | Lane | 280/42 |
| 4,185,848 | 1/1980 | Holtz | 280/655.1 |
| 4,248,442 | 2/1981 | Barrett | 280/47.371 |
| 4,878,682 | 11/1989 | Lee | 280/42 |
| 4,953,878 | 9/1990 | Sbragia | 280/42 |
| 4,976,447 | 12/1990 | Batson | 280/33.994 |
| 5,046,748 | 9/1991 | Oat-Judge | 280/33.994 |
| 5,090,724 | 2/1992 | Fiore | 280/DIG. 4 |
| 5,288,089 | 2/1994 | Bowers et al. | 280/33.994 |
| 5,294,158 | 3/1994 | Cheng | 280/DIG. 4 |
| 5,692,761 | 12/1997 | Havlovitz | 280/655.1 |

*Primary Examiner*—Richard M. Camby
*Attorney, Agent, or Firm*—Kenneth L Tolar

[57] ABSTRACT

A combination shopping cart and basket includes a basket member having a pair of opposing gripping members to assist a user in lifting the device. The basket member is dimensioned to be received within a vehicle's trunk. A handle is attached to the top edge of the basket and is pivotable between an outwardly extending position to function as a shopping cart handle and horizontal position, superimposed on the basket member allowing the basket to be stored within the trunk. The basket member is mounted on a wheel assembly and includes a brake assembly to assist a user in stopping the device.

14 Claims, 2 Drawing Sheets

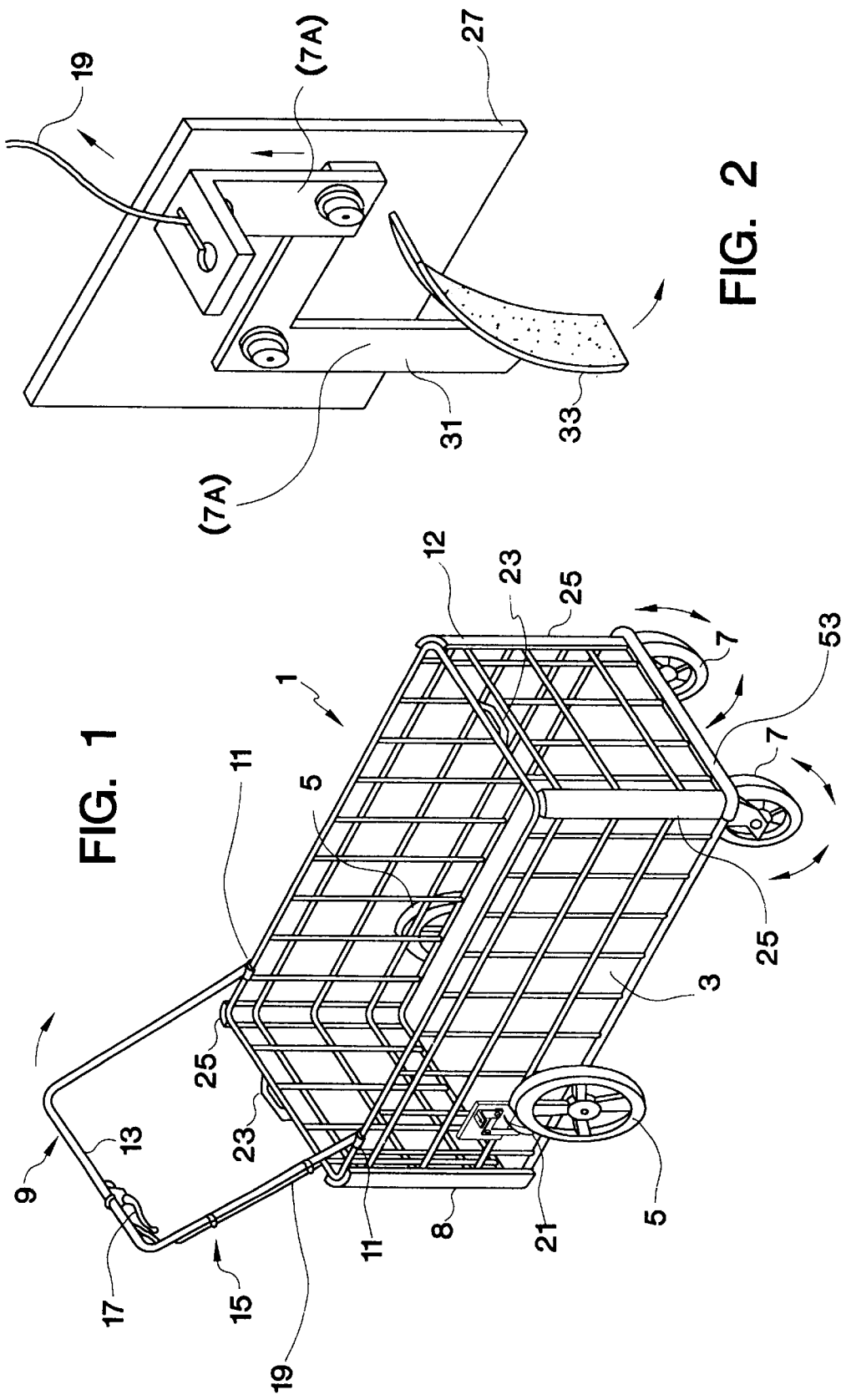

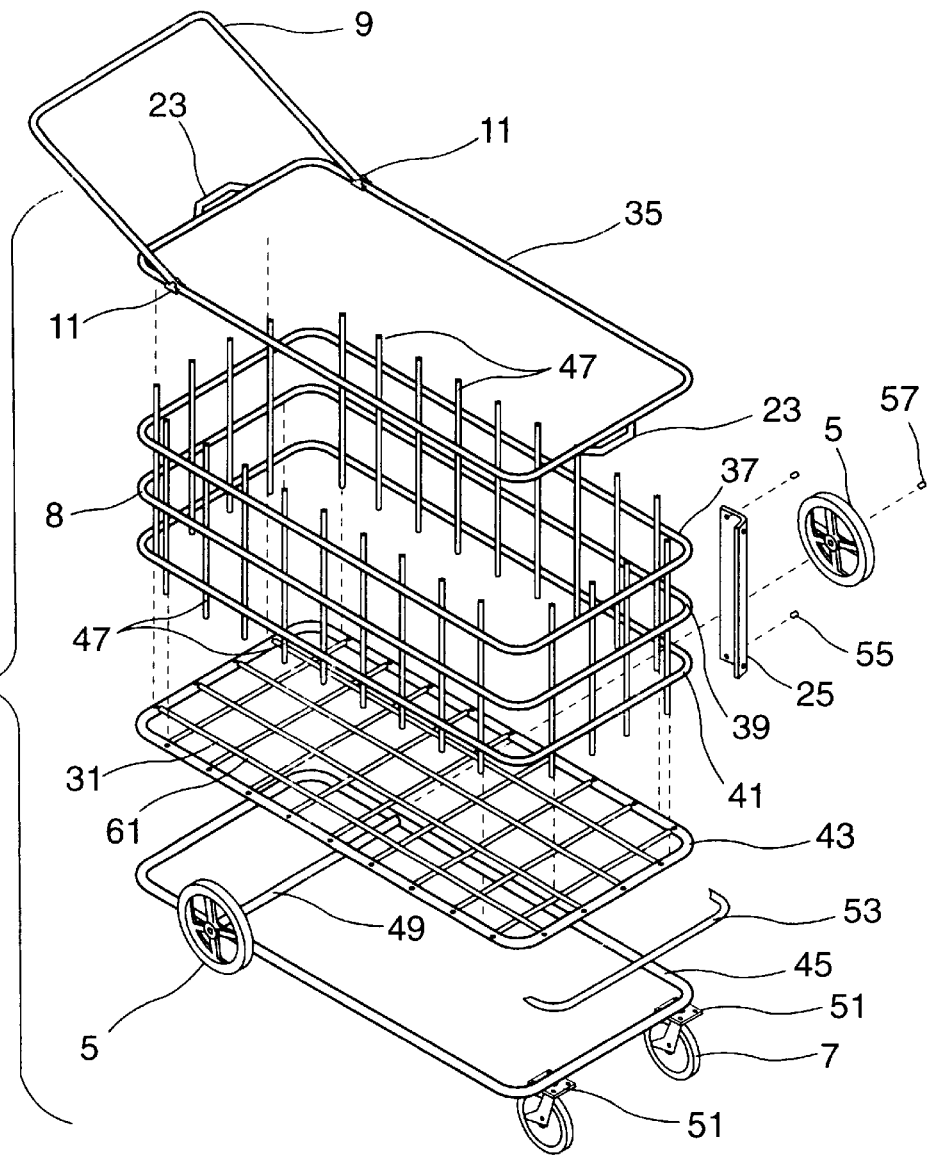

HOME SHOPPING CART

BACKGROUND OF THE INVENTION

The present invention relates to a low profile shopping cart which may be conveniently transported in the trunk of a vehicle. Once groceries are purchased and loaded into the cart, the cart and its contents may be simultaneously loaded into a vehicle and subsequently transported from the vehicle to a user's kitchen.

DESCRIPTION OF THE PRIOR ART

Supermarket customers typically load groceries into a conventional shopping cart, pay for the groceries and then transport the cart to the customer's vehicle. The customer must then individually transfer the items to the trunk or passenger compartment which is time consuming and laborious. Once the user returns to his or her residence, the items must again be individually transported indoors.

The present invention addresses the above described problems by providing a combination shopping cart and portable basket which may be compactly stored within a vehicle trunk. Accordingly, when the cart is loaded with groceries at the market, the cart and its contents may be concurrently transferred to and from the vehicle eliminating the burdensome task of individually handling the grocery bags.

Various shopping and utility carts are generally known in the prior art. For example, U.S. Pat. No. 5,090,724 issued to Fiore relates to a standup stroller including a fold up type shopping cart frame with a supportive pad on the bottom of the frame allowing an infant to stand within the stroller. The device further includes a collapsible seat built within the frame on which an infant may sit. An elongated handle is attached to opposing sides of the frame structure for pushing the stroller along a support surface.

U.S. Pat. No. 3,112,934 issued to Buczak relates to a nesting market cart comprising a basket supported by a frame and a tray secured to the frame beneath said basket. A shelf projects rearwardly of the tray which may be pivoted vertically when nesting a second cart therewithin.

U.S. Pat. No. 5,046,748 issued to Oat-Judge relates to a walker including a basket and handle secured thereto for pushing the walker along the ground. A pair of levers are attached to the handle for operating a cable actuated brake pad adjacent one of the wheels. The device additionally includes a second braking mechanism that engages the ground when a predetermined amount of force is applied to the handle or basket.

Although various carts and similar vehicles exist in the prior art, none relate to a low profile, easily disassembled cart/basket having an elongated handle pivotally engaging its top edge which functions as an outwardly extending shopping cart handle. The handle may be pivoted inwardly towards the basket until the handle is superimposed thereon allowing the basket to be conveniently stored within a vehicle's trunk. The basket further includes a pair of opposing handgrips that assist a user in lifting the device.

SUMMARY OF THE INVENTION

The present invention relates to a low profile shopping cart including a substantially rectangular basket member formed of several detachable components. The basket is mounted onto a wheel assembly allowing the device to easily roll along a support surface. A U-shaped handle has a pair of terminal ends, each of which are pivotally attached to opposing sides of the basket at its upper edge. The handle is movable between an outwardly extending, oblique position where it may be used to push the cart and a substantially horizontal position superimposed on the basket member allowing the cart to be stored within a vehicle. The basket further includes a pair of opposing hand grips on its upper edge to assist a user in lifting the device.

It is the primary object of the present invention to provide for an improved low profile portable cart.

Another object is to provide for such a cart those handles may be folded down to permit its easy storage in a confined spaced such as a vehicle's trunk.

These and other objects and advantages of the present invention will become apparent to readers from a consideration of the ensuing description and the accompanying drawings.

BRIEF DESCRIPTION OF THE DRAWINGS

FIG. 1 is a side perspective view of the invention's preferred embodiment.

FIG. 2 is an enlarged detail perspective side view of the wheel braking system according to the present invention.

FIG. 3 shows an exploded perspective side view of the major components for a second embodiment.

FIG. 4 is a detail view showing how the vertical supports posts are joined and insert to the upper frame member.

DESCRIPTION OF THE PREFERRED EMBODIMENT

Referring now to FIGS. 1 through 4, the present invention relates to a low profile portable shopping cart. The device includes a basket member 1 having a substantially rectangular upper frame member 2 having two longitudinal 3 and two lateral sides 4. Each side of the upper frame member includes a plurality of apertures 6 on its lower surface. A hand grip 5 is attached to each lateral side allowing the device to be easily lifted and placed into a vehicle. The basket member also includes an intermediate frame member 7 having a plurality of substantially rectangular horizontal barrier members 8 interconnected with a plurality of internally disposed vertical support posts 9 each having a top and a bottom end. The basket further includes a substantially rectangular lower frame member 10 having two longitudinal and two lateral sides. Each side includes a plurality of apertures 27 peripherally disposed on its upper surface. The lower frame may have a mesh configuration as depicted in FIG. 3 or a solid construction as depicted in FIG. 1.

The basket member may be quickly and conveniently assembled by inserting the top ends of the vertical support posts into the apertures on the upper frame member and the lower ends into the apertures on the lower frame member. The detachable components of the basket member are held together with arcuate bracket members 11 that abut each corner of the intermediate basket member and are secured to the upper and lower frame members with rivets 20 or a similar fastener means. Accordingly, the various components of the basket member may be quickly and conveniently disassembled for transport or storage.

The present invention also includes a U-shaped handle 17 having a pair of terminal ends. A first terminal end pivotally engages a longitudinal side of the upper frame member while a second terminal end pivotally engages the opposing longitudinal side. The handle is pivotable between a first position in which it extends obliquely and outwardly from the basket member and a second, substantially horizontal position in which it is superimposed on top of the basket member allowing the entire device to be loaded into a vehicle trunk.

The device further comprises a wheel assembly 12 including a substantially rectangular border member 13 having front and rear ends and two sides with a transverse, rear wheel axle 28 mounted thereto. A wheel 21 is attached to each end of the axle. Each wheel has tread 14 or a similar traction means on its exterior surface to prevent the wheels from slipping on a support surface. A pair of front wheels 22 are mounted to the front end of the border. Preferably, the front wheels swivel to assist in steering the cart. A bumper member 23 is secureable to the front end of the wheel assembly border immediately above the front wheels to minimize collisions with stationary objects.

A braking assembly 15 is also included for stopping the cart. The assembly includes a pivotable lever 16 attached to the intermediate portion of the U-shaped handle. The lever, when pivoted, reciprocates a cable 29 extending along a side of the basket member having a vertical arm 24 secured to a distal end thereof A plate 23 is secured to a side of the intermediate frame member immediately adjacent a rear wheel. An L-shaped brake pad actuator 25 has a first end pivotally attached to the bottom end of the vertical arm and an intermediate portion pivotally attached to the plate. A second end has an arcuate brake pad 26 attached thereto configured to substantially conform to the outer periphery of the adjacent rear wheel. Accordingly, as the lever is depressed, the cable is retracted pulling the arm upwardly to pivot the actuator thereby thrusting the brake pad against the wheel.

The other parts including the aluminum tubing used for the handle 9 and other desired components, axle snap clips 57 and the four wheels are all commercially available as "off the shelf" parts. The Thomas Register of American Manufacturers is a good resource for locating suppliers for these parts.

The basket member according to the present invention is preferably constructed with aluminum, steel or a similar equivalent. The wheels and bumper are preferably constructed with rubber. However, as will be readily apparent to those skilled in the art, the size, shape and materials of construction of the various components may be varied without departing from the spirit of the present invention.

What I claim as my invention is:

1. A low profile, portable shopping cart comprising:

a mesh wire frame basket member having an upper edge and a lower edge, said basket member dimensioned to be receivable within a vehicle storage compartment, said basket member including an upper substantially rectangular frame member having four sides and four corners and a plurality of peripheral apertures on its lower surface, a substantially rectangular intermediate frame member having four sides and four corners including a plurality of horizontal, substantially rectangular barrier members with a plurality of vertical spaced posts secured thereto, each vertical post having a top and bottom end with the top end removably received within said apertures on said upper frame member, a substantially rectangular lower frame member having four sides and four corners and a plurality of apertures on its upper surface each for removably receiving the bottom end of a vertical support post allowing said basket member to be easily disassembled;

a substantially U-shaped handle having a pair of terminal ends, each end pivotally attached to the upper edge of said basket member, said handle pivotable between an oblique position extending outwardly from said basket member and a substantially horizontal position superimposed on said basket member;

a wheel assembly attached to the lower edge of said basket member for rolling said basket member along a support surface.

2. A device according to claim 1 further comprising an arcuate bracket member engaging each corner of said intermediate frame member and secured to the upper and lower frame members to provide structural integrity to said basket member.

3. A device according to claim 2 wherein said lower frame member has a mesh configuration.

4. A device according to claim 2 wherein said lower frame member has a solid configuration.

5. A device according to claim 2 further comprising a pair of opposing gripping members attached to the upper edge of said basket member for assisting a user in lifting said basket ember.

6. A device according to claim 5 wherein said wheel assembly comprises:

a substantially rectangular border member attached to the lower edge of said basket member, said border having front and rear ends and two opposing sides;

a transverse rear wheel axle extending from a first side of said border to a second side of said border having a wheel at each end, each of said wheels having tread on its exterior surface for frictionally engaging a support surface;

a pair of front wheels swivelly mounted to the front end of said border.

7. A device according to claim 6 further comprising a bumper member attached to the front end of said border to minimize the impact when said wheel assembly collides with a stationary object.

8. A device according to claim 7 further comprising a lever pivotally attached to said U-shaped handle, said lever in communication with a brake pad assembly immediately adjacent a rear wheel that frictionally engages said wheel upon said lever being pivoted to a first position.

9. A device according to claim 8 wherein said brake pad assembly further includes a plate secured to a side of said basket member proximal a rear wheel;

an L-shaped actuator having first and second ends with an intermediate portion pivotally secured to said plate, said first end having an arcuate brake pad secured thereto;

an arm attached to the second end of said actuator;

a cable having two ends with a first end attached to said arm and the second attached to said lever.

10. A low profile portable shopping cart comprising:

a mesh wire frame basket member having an upper edge and a lower edge, said basket member dimensioned to be receivable within a vehicle storage compartment;

a substantially U-shaped handle having a pair of terminal ends, each end pivotally attached to the upper edge of said basket member, said handle pivotable between an oblique position extending outwardly from said basket member and a substantially horizontal position superimposed on said basket member;

a wheel assembly attached to the lower edge of said basket member for rolling said basket member along a support surface, said wheel assembly including a substantially rectangular border member attached to the lower edge of said basket member, said border having front and rear ends and two opposing sides, a transverse rear wheel axle extending from a first side of said border to a second side of said border having a wheel at each end, each of said wheels having tread on its exterior surface for frictionally engaging a support surface and a pair of front wheels swivellably mounted to the front end of said border;

a lever pivotally attached to said U-shaped handle, said lever in communication with a brake pad assembly immediately adjacent a rear wheel that frictionally engages said wheel upon said lever being pivoted to a first position, wherein said brake pad assembly further includes a plate secured to a side of said basket member proximal a rear wheel;

an L-shaped actuator having first and second ends with an intermediate portion pivotally secured to said plate, said first end having an arcuate brake pad secured thereto;

an arm attached to the second end of said actuator;

a cable having two ends with a first end attached to said arm and the second attached to said lever.

11. A device according to claim 10 further comprising a pair of opposing gripping members attached to the upper edge of said basket member for assisting a user in lifting said basket member.

12. A device according to claim 11 further comprising a bumper member attached to the front end of said border to minimize the impact when said wheel assembly collides with a stationary object.

13. A device according to claim 12 wherein said basket member comprises:

an upper substantially rectangular frame member having four sides and four corners and a plurality of peripheral apertures on its lower surface;

a substantially rectangular intermediate frame member having four sides and four corners including a plurality of horizontal, substantially rectangular barrier members with a plurality of vertical spaced posts secured thereto, each vertical post having a top and bottom end with the top end removably received within said apertures on said upper frame member;

a substantially rectangular lower frame member having four sides and four corners and a plurality of apertures on its upper surface each for removably receiving the bottom end of a vertical support post allowing said basket member to be easily disassembled.

14. A device according to claim 13 further comprising an arcuate bracket member engaging each corner of said intermediate frame member and secured to the upper and lower frame members to provide structural integrity to said basket member.

* * * * *